Patented Jan. 23, 1945

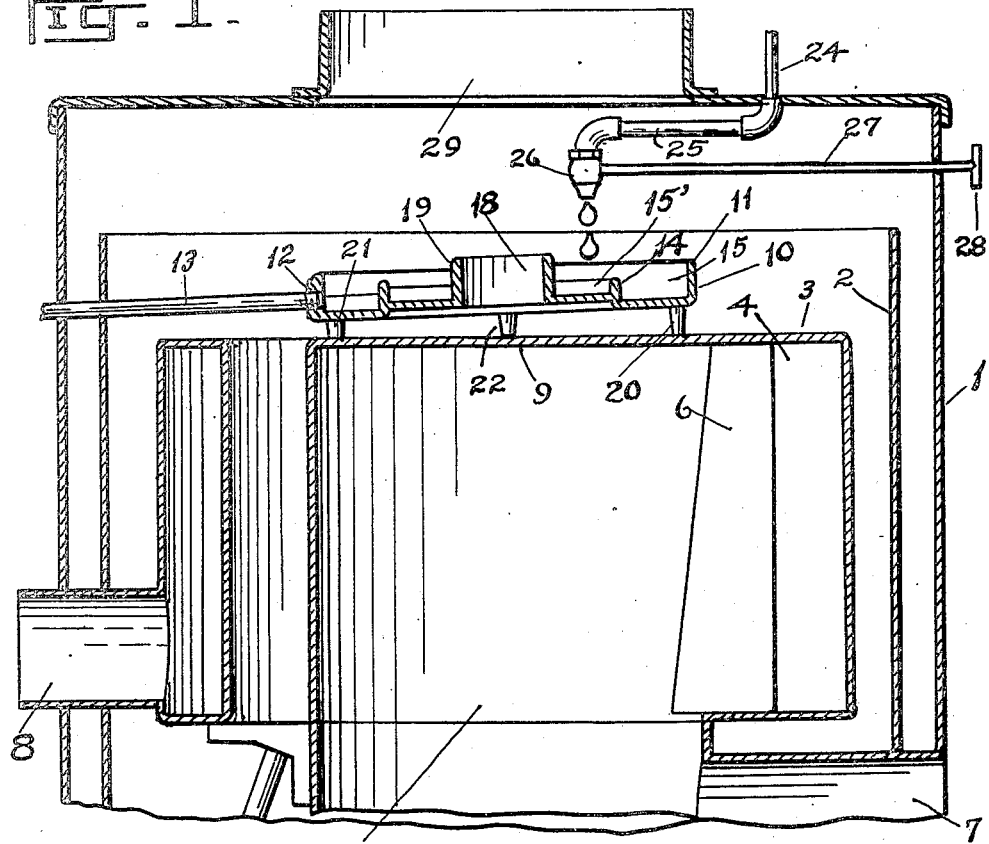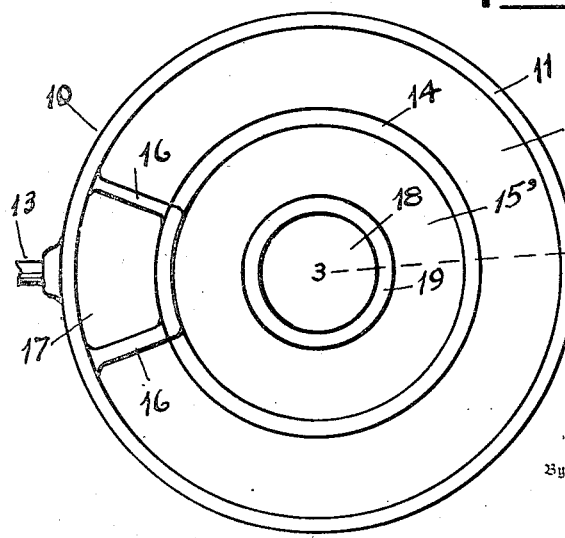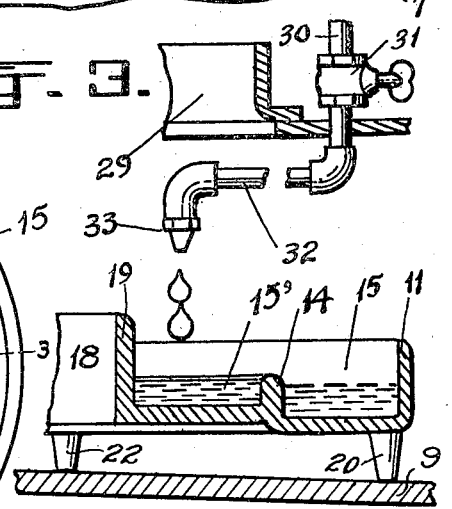

2,368,057

UNITED STATES PATENT OFFICE 2,368,057

HUMIDIFIER

Henry Weyenberg, Holland, Mich., assignor to Holland Furnace Company, Holland, Mich., a corporation Application June 7, 1941, Serial No. 397,074

1 Claim. (Cl. 126—113)

My present invention relates to improvements in air heating furnaces such as are employed in dwellings and like buildings, the improvements being particularly concerned with the construction and installation of the humidifiers by which the air heated within the furnace is charged with moisture in controlled amount as it leaves the furnace for its excursion through the heat conductor pipes; and the objects of improvement are, first, to provide a humidifier for air heating furnaces that will be cheap to produce and install; second, to provide a humidifier for air heating furnaces that will be more efficient than humidifiers heretofore employed; third, to provide a humidifier for air heating furnaces that will charge the air that has been heated in the furnace adjacent the air conductor pipe opening; fourth, to provide a humidifier for air heating furnaces that can be readily removed for cleaning; fifth, to provide a humidifier for air heating furnaces that can readily be installed subsequent to the installation of the furnace.

I attain these named objects and such other objects as appear upon perusal of the following description when taken in connection with the accompanying drawing disclosing the humidifier structure and its installation in an air heating furnace, and in which Figure 1 is a vertical sectional view of an air heating furnace having one of my improved humidifiers installed therein.

Figure 2 is an enlarged plan view of my humidifier unit removed from the furnace.

Figure 3 is an enlarged fragmentary cross-sectional view of my humidifier unit, the view showing a different way of delivering and controlling the water to the humidifier than that shown in Figure 1 as taken on line 3—3 of Figure 2 including the water drip valve, nozzle with its piping and a fragmentary portion of the top of the furnace.

Referring to the drawing, similar numerals refer to similar parts of the invention throughout the several views, and referring thereto.

Numeral 1 designates the outer casing of the furnace having supported therein in spaced apart relation thereto, heat deflector 2 extending vertically and surrounding the periphery of heat radiator 3 having therein heat distribution chamber 4 connected with the combustion chamber 5 by vertically elongated flue 6; the combustion chamber has below the heat radiator, combustion flame inlet pipe 7 through which the burning fuel is projected to the combustion chamber during operation of the furnace where substantially complete combustion takes place with the heat generated thereby passing through the elongated flue 6 to the heat distribution chamber 4 of the radiator and from where the products of combustion passes through pipe 8 to the chimney or stack. The combustion chamber 5 has top deck plate 9 which may be flat as shown in Figure 1 of the drawing, crowned upward or concave, the plate 9 whether flat, crowned or concave has mounted thereon, the humidifier unit 10, comprising in its present form, annular vertical wall 11 having screw threaded hole 12 into which is screwed drain over-flow pipe 13, annular vertical wall 14 forming therebetween an annular wall 11, annular trough 15 having at its side nearest the pipe 13, transversely extending ribs 16 forming pocket 17 and dams for maintaining water in the trough 15 at its lower side adjacent said pocket 17 from which extends the pipe 13, for draining the pocket 17. At the axis of the humidifier unit 10 is vertically extending hole 18 which causes a circulation of heated air between the deck plate 9 and the unit 10, the hole has annular wall 19 extending upward a greater height than the wall 11 which is higher than the annular wall 14, thereby forming trough 15'. Supporting the humidifier unit on the deck plate 9 are legs 20, 21 and 22, of which the leg 20 has a greater length than legs 22 and still greater than leg 21 located diametrically opposite of the unit from leg 20, thereby causing the humidifier unit to have incline relation with the said deck plate 9, the incline causing water to flow to the lower side of the trough 15', over the wall 14 into trough 15 and pocket 17 from where excess water flows off through pipe 13 to the exterior of the furnace. Water for raising the moisture content of the air heated in the furnace is conducted as shown in Figure 1, through pipes 24 and 25 having manually controlled valve 26 operated by rod 27 turnable by handle 28. Directly above hole 18 of the humidifier unit and extending upward from the furnace top plate and in alignment with the hole 18 of the humidifier unit is heated air conductor pipe connecting thimble 29. As shown in Figure 3, the water flow to the humidifier unit is downward through supply pipe 30 having exterior of the furnace casing, control valve 31, through horizontally disposed pipe 32 and nozzle 33 from which it drops into trough 15' and distributed as shown in Figure 1.

In the operation of my humidifier in connection with the air heating furnace as shown and described, the fire having been started, the troughs 15 and 15' of the humidifier are charged with water by opening the valves 26 by the rod 27 and handle 28, or valve 31, opening these valves permits water to flow to the troughs of the humidifier which because of the heated condition of the humidifier causes the water to vaporize almost instantly at the higher portion of the troughs and charge the heated air passing through the furnace with moisture before it leaves the furnace on its heating excursion and which is tested for percentage of moisture and regulated by either opening or closing the valves 26 or 31 as required to produce the desired humidity which should be for best health condition between 64 and 66 per cent for rooms heated. My humidifier can be more accurately controlled, because the water at its thin fringe-like edge at the higher portion of the troughs is evaporated more quickly than at the lower portion of the troughs where the water accumulates in a body of considerable thickness which takes longer to start evaporation and the air is charged after it has been heated and just before it leaves the furnace, than where the air is charged in its cool state below the combustion chamber as heretofore. The thin fringe of water at the higher portion of the troughs evaporates more quickly than the body of water at the lower portion of the troughs, thereby causing a variable of evaporation with the thin fringe of the water evaporating rapidly and the thicker body evaporating more slowly. This is important for high efficiency. Where the water is of uniform thickness as would occur where the humidifier was set level, humidity would not be uniform through periods of time.

Having described my invention, I claim:

A humidifier for an air heating furnace comprising an annular body having an upstanding outer rim, an upstanding inner rim defining an axially disposed, vertically extending passage through said body, an intermediate upstanding annular wall of less height than said rims and forming two concentric troughs, means forming a pocket at one side of the outer trough, legs of unequal length supporting the body, the shorter of which is adjacent said pocket, a drain for said pocket, and means to supply water to the inner trough.

HENRY WEYENBERG.